United States Patent [19]

Hegedüs et al.

[11] 3,920,728

[45] Nov. 18, 1975

[54] SEPARATION AND RESOLUTION OF ISOMERIC FORMS OF 3-(3,4-DIHYDROXY-PHENYL)-SERINE

[75] Inventors: Balthasar Hegedüs, Binningen; Anna Krasso, Basel, both of Switzerland

[73] Assignee: Hoffmann-La Roche Inc., Nutley, N.J.

[22] Filed: July 30, 1974

[21] Appl. No.: 493,013

[30] Foreign Application Priority Data
Aug. 22, 1973 Switzerland.................... 12056/73

[52] U.S. Cl............. 260/471 C; 260/519; 424/300; 424/319
[51] Int. Cl.² ...................................... C07C 125/06
[58] Field of Search ........................ 260/471 C, 519

[56] References Cited
UNITED STATES PATENTS
3,843,796    10/1974    Miller ................................ 260/519

Primary Examiner—Lorraine A. Weinberger
Assistant Examiner—L. A. Thaxton
Attorney, Agent, or Firm—Samuel L. Welt; Jon S. Saxe; George M. Gould

[57] ABSTRACT

Rac-threo/erythro-3-(3,4-dihydroxyphenyl)-serine can be converted to its threo and erythro forms by an improved process. In addition, the aforesaid threo and erythro forms can be readily resolved to produce the novel four optical antipodes thereof. The compounds prepared herein are CNS agents. They are precursors for the biogenic catecholamines or antagonists against the biogenic catecholamines. Also, they exhibit antihypertensive and psychotropic activity.

21 Claims, No Drawings

SEPARATION AND RESOLUTION OF ISOMERIC FORMS OF 3-(3,4-DIHYDROXY-PHENYL)-SERINE

BACKGROUND OF THE INVENTION

The separation of rac-threo and rac-erythro-3-(3,4-dihydroxyphenyl)-serine through fractionation of 3-(3,4-dibenzyloxyphenyl)-serine from t-butanol and hydrogenolysis is described in J.A.C.S., 76, 1322 (1954) and Ber. 87, 892 (1954).

Treatment of mice with rac-erythro-3-(3,4-dihydroxyphenyl)-serine has produced elevated noradrenaline in the heart and brain, as reported in Life Sciences, Vol. II, Part I, pages 787–795 (1972).

DESCRIPTION OF THE INVENTION

It has been found that the separation of the threo and erythro forms of rac-threo/erythro-3-(3,4-dihydroxyphenyl)-serine can be carried out in a simple manner by salification of rac-threo/erythro-3-(3,4-dibenzyloxyphenyl)-N-carbobenzoxyserine with dicyclohexylamine in acetonitrile, whereafter the separated threo and erythro forms are subsequently converted into rac-threo- or rac-erythro-3-(3,4-dihydroxyphenyl)-serine by hydrogenolysis. The separation is effected in a simple and reproducible manner with high yields because of the surprising discovery that, on the one hand, the dicyclohexylamine salt of rac-threo-(3,4-dibenzyloxyphenyl)-N-carbobenzoxyserine is relatively insoluble in acetonitrile and, on the other hand, the rac-erythro-3-(3,4-dibenzyloxyphenyl)-N-carbobenzoxyserine is relatively insoluble in chloroform.

In addition, it has been found that rac-threo- or rac-erythro-3-(3,4-dibenzyloxyphenyl)-N-carbobenzoxyserine can be resolved into the corresponding four optical antipodes. Rac-threo-3-(3,4-dibenzyloxyphenyl)-N-carbobenzoxyserine, for example, can be resolved into the corresponding (−)-threo or (+)-threo forms by treatment in ethanolic solution with optically active ephedrine or optically active threo-1-(p-nitrophenyl)-2-amino-1,3-propanediol. Rac-erythro-3-(3,4-dibenzyloxyphenyl)-N-carbobenzoxyserine can be separated into the corresponding (−)-erythro or (+)-erythro forms by treatment in ethanolic solution with optically active threo-1-(p-nitrophenyl)-2-amino-1,3-propanediol. The four stereomeric forms of 3-(3,4-dibenzyloxyphenyl)-N-carbobenzoxyserine obtained are then hydrogenolytically converted into the corresponding (−)-threo-, (+)-threo-, (−)-erythro- or (+)-erythro-3-(3,4-dihydroxyphenyl)-serine.

The process aspects of the invention concern the preparation of the rac-threo, rac-erythro, (−)-threo, (+)-threo, (−)-erythro and (+)-erythro forms of 3-(3,4-dihydroxyphenyl)-serine as well as salts of these compounds. Thus, a solution of rac-threo/erythro-3-(3,4-dibenzyloxyphenyl)-N-carbobenzoxyserine is treated in acetonitrile with dicyclohexylamine and the precipitated rac-threo-3-(3,4-dibenzyloxyphenyl)-N-carbobenzoxyserine dicyclohexylamine salt is isolated.

The substance remaining in the mother liquor is acidified, the solvent is replaced by chloroform and the resulting precipitate consisting of rac-erythro-3-(3,4-dibenzyloxyphenyl)-N-carbobenzoxyserine is isolated. Following replacement of the chloroform solvent by acetonitrile in the remaining mother liquor, the acetonitrile solution is treated with dicyclohexylamine and the precipitated rac-threo-3-(3,4-dibenzylphenyl)-N-carbobenzoxyserine dicyclohexylamine salt is recycled into the process.

The rac-threo-3-(3,4-dibenzyloxyphenyl)-N-carbobenzoxyserine dicyclohexylamine salt obtained is acidified and resolved into the corresponding salts of (−)-threo- or (+)-threo-3-(3,4-dibenzyloxyphenyl)-N-carbobenzoxy-serine by treatment in ethanolic solution with optically active ephedrine or optically active threo-1-(p-nitrophenyl)-2-amino-1,3-propanediol.

The rac-erythro compound obtained above is separated into the corresponding salts of (−)-erythro- or (+)-erythro-3-(3,4-dibenzyloxyphenyl)-N-carbobenzoxyserine by treatment in ethanolic solution with optically active threo-1-(p-nitrophenyl)-2-amino-1,3-propanediol.

The aforesaid 3-(3,4-dibenzyloxyphenyl)-N-carbobenzoxyserine salts obtained above are converted into the corresponding carboxylic acid by acidification, the resulting 3-(3,4-dibenzyloxyphenyl)-N-carbobenzoxyserine is subjected to hydrogenolysis and, if desired, the 3-(3,4-dihydroxyphenyl)-serine produced in rac-threo, rac-erythro, (−)-threo, (+)-threo, (−)-erythro or (+)-erythro form is converted into a salt.

The reaction in accordance with the invention of rac-threo/erythro-3-(3,4-dibenzyloxyphenyl)-N-carbobenzoxyserine with dicyclohexylamine in acetonitrile is preferably carried out using approximately equimolar amounts of the two reaction participants. The dicyclohexylamine salt of the rac-threo form cyrstallizes pure in a short time in high yields. In the mother liquor is present a mixture of the dicyclohexylamine salts of the diastereomers rac-threo- or rac-erythro-3-(3,4-dibenzyloxyphenyl)-N-carbobenzoxyserine in a ratio of about 1:1 according to the NMR spectrum. In order to obtain pure rac-erythro-3-(3,4-dibenzyloxyphenyl)-N-carbobenzoxyserine from this mixture, the diastereomeric dicyclohexylamine salts have to be acidified, since a clean separation does not occur via the dicyclohexylamine salts. The acidification is effected, for example, with the aid of hydrogen chloride gas in ethyl acetate, there being obtained rac-threo/erythro-3-(3,4-dibenzyloxyphenyl)-N-carbobenzoxyserine (mixture of the threo and the erythro form in a ratio of about 1:1). It has been shown that rac-erythro-3-(3,4-dibenzyloxyphenyl)-N-carbobenzoxyserine is very difficult to dissolve in chloroform, especially in cold chloroform, and can thus be obtained pure. The threo form of rac-3-(3,4-dibenzyloxyphenyl)-N-carbobenzoxyserine, in this case still remaining in the mother liquor, can be isolated pure by repeated treatment of the mother liquor with dicyclohexylamine and by this means the yields of the threo form can be increased.

The rac-threo-3-(3,4-dibenzyloxyphenyl)-N-carbobenzoxyserine dicyclohexylamine salt obtained above can be resolved into the (−)-threo or (+)-threo forms. First, the said salt is neutralized by acidification, for example, with hydrogen chloride in ethyl acetate. The resulting free carboxylic acid product is treated in ethanolic solution with a resolving agent, for example, with (+)-ephedrine, the (+)-ephedrine salt of (−)-threo-3-(3,4-dibenzyloxyphenyl)-N-carbobenzoxyserine precipitating out. About 0.5 mol of resolving agent is preferably used per mol of acid. After a single recrystallization from methanol, the compound is optically pure.

The (+)-threo form can be isolated from the mother liquor either by preparation of the (−)-ephedrine salt or the (−)-threo-1-(p-nitrophenyl)-2-amino-1,3- propanediol salt. About 0.5 mol of resolving agent is preferably used per mol of acid. A recrystallization from methanol is preferred for producing the necessary optical purity.

The salts thus obtained can be converted into (−)-threo- or (+)-threo-3-(3,4-dibenzyloxyphenyl)-N-carbobenzoxyserine by acidification, for example, with an aqueous mineral acid, such as aqueous hydrochloric acid.

Resolution of rac-erythro 3-(3,4-dibenzyloxyphenyl)-N-carbobenzoxyserine is readily accomplished by employing (−)-threo- or (+)-threo-1-(p-nitrophenyl)-2-amino-1,3-propanediol. About 0.5 mol of resolving agent is preferably used per mol of acid, the (−)-(−) salt or the (+)-(+) salt first crystallizing out respectively. The salts thus obtained are preferably recrystallized from methanol.

The resulting rac-threo, rac-erythro, (−)-threo, (+)-threo, (−)-erythro and (+)-erythro forms of 3-(3,4-dibenzyloxyphenyl)-N-carbobenzoxyserine are converted into the corresponding form of 3-(3,4-dihydroxyphenyl)-serine by hydrogenolysis. Obtained salts of 3-(3,4-dibenzyloxyphenyl)-N-carbobenzoxyserine are in this case initially converted into 3-(3,4-dibenzyloxyphenyl)-N-carbobenzoxyserine by acidifcation, which is hydrogenolytically treated in the usual manner, for example, with the aid of hydrogen and a noble metal catalyst such as, for example, palladium-carbon. The hydrogenation is preferably carried out in a lower alkanol, for example, ethanol. The temperature for this is not critical and can be conveniently performed between about 0° and 80°C.

The rac-threo-, rac-erythro-, (−)-threo, (+)-threo, (−)-erythro and (+)-erythro-3-(3,4-dihydrophenyl)-serines obtained in the aforementioned manner have an amphoteric character and can form salts not only with acids but also with bases. As acids, there come into consideration inorganic acids, for example, hydrohalic acids such as hydrochloric acid, hydrobromic acid or hydroiodic acid, or also organic acids, for example, citric acid, ascorbic acid or maleic acid, etc. Bases, for example, are sodium, potassium and ammonium hydroxide, dicyclohexylamine, ephedrine or 1-(p-nitrophenyl)-2-amino-1,3-propanediol. Non-pharmaceutically acceptable salts of the subject compounds can readily be converted in pharmaceutically acceptable salts by techniques well known to the art including ion exchange or neutralization followed by resalification.

The process products, i.e., rac-threo-, rac-erythro-, (−)-threo-, (+)-threo, (−)-erythro- and (+)-erythro-3-(3,4-dihydrpxyphenyl)-serine as well as their salts, are distinguished by various actions on the nervous system. They represent, inter alia, precursors for the biogenic catecholamines or antagonists against the biogenic catecholamines and furthermore are anti-hypertensively and psychotropically active, i.e., as anti-depressant agents. They can accordingly find use as medicaments, e.g., in the form of pharmaceutical preparations which contain them or their salts in admixture with a pharmaceutical, organic or inorganic, inert carrier material suitable for enteral, e.g., oral, or parenteral application such as, for example, water, gelatine, lactose, starch, magnesium stearate, talc, vegetable oils, gum arabic, polyalkylene glycols, Vaseline, etc. The pharmaceutical preparations can be present in a solid form, e.g., as tablets, dragees, suppositories, capsules, or a liquid form, e.g., as solutions, suspensions or emulsions. They are optionally sterilized and/or contain adjuvants such as preservatives, stabilizers, wetting agents, emulsifiers, salts for varying the osmotic pressure or buffers. They can also contain other therapeutically valuable materials.

Expedient pharmaceutical dosage forms contain about 10 to about 500 mg of one of the process products. Expedient oral dosage ranges lie at about 1 mg/kg/day to about 20 mg/kg/day, preferably between about 1 mg/kg/day to about 10 mg/kg/day. Expedient parenteral dosage ranges lie at about 0.1/mg/kg/day to about 5 mg/kg/day, preferably between about 0.1 mg/kg/day to 1 mg/kg/day. Moreover, the said ranges can be extended upwards or downwards according to individual requirement and instruction of the person skilled in the art.

The pharmaceutical preparation can further contain one or more peripheral decarboxylase inhibitors, which allows one to lower the dosage of the active material. Suitable decarboxylase inhibitors include all pharmaceutically compatible substances which inhibit decarboxylase in the extra-cerebral organs and thus reduce the decarboxylation of the active materials in these organs.

As decarboxylase inhibitors one may employ compounds of the formula:

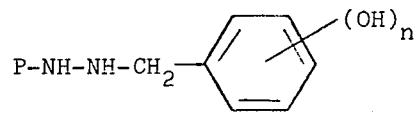

where P is hydrogen or a hydroxy substituted amino lower alkanoyl group and n is selected from the integers 2 or 3, or a pharmaceutically acceptable salt thereof.

Examples of suitable decarboxylase inhibitors of the above formula include:

$N^1$-D,L-seryl-$N^2$-(2,3,4-trihydorxybenzyl)-hydrazide
$N^1$-L-seryl-$N^2$ -(2,3,4-trihydroxybenzyl)-hydrazide
$N^1$-glycyl-$N^2$-(2,3,4-trihydroxybenzyl)-hydrazide
$N^1$-D,L-tryosyl-$N^2$-(2,3,4-trihydroxybenzyl)-hydrazide
$N^1$-L-tyrosyl-$N^2$-(2,3,4-trihydroxybenzyl)-hydrazide
or pharmaceutically acceptable salts thereof.

Other types of useful decarboxylase inhibitors which may be employed in conjunction with the compounds of the present invention include benzyliden-acetophenone, L-3-(3,4-dihydroxyphenyl)-2-methylalanine and compounds of the general formula:

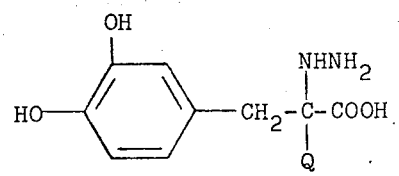

wherein Q is hydrogen or a lower alkyl group.

In the case where the pharmaceutical preparation contains a decarboxylase inhibitor, the ratio of active compound to decarboxylase inhibitor is in the range of from about 1:1 to about 4:1.

Preparations which contain a decarboxylase inhibitor can be prepared in several ways. Thus, the inhibitor, the active material and the pharmaceutical support material can be mixed up together. Alternatively, the active material and the pharmaceutical support material can be pressed into a kernel, the kernel is then provided with a digestive juiceresistant coating and thereafter a layer is put on which contains the decarboxylase inhibitor. In this way, there is attained in a convenient manner, a delay of 30 to 60 minutes after oral administration of the medicament between the first release of the decarboxylase inhibitor and the following release of the active substance.

It parenteral administration is employed, then the decarboxylase is administered first followed by the active substance 30 to 60 minutes later.

Utilization of the combined application of active substance and decarboxylase inhibitor results in the lowering of the dosage range employed. For example, a daily dosage range of from about 400 mg active substance and 100 mg of decarboxylase inhibitor (ratio 4:1) to about 200 mg active substance and 200 mg decarboxylase inhibitor (ratio 1:1) can be employed.

The antihypertensive activity of the inventive compounds can be demonstated by oral administration to rats. Thus, for example, after twice daily dosage of 200 mg/kg of (+)-erythro-3-(3,4-dihydroxyphenyl)-serine to a group of 5 hypertensive rats (initial systolic blood pressure: 206 mmHg) for four consecutive days, one observes a blood pressure drop of 20 to 30 mmHg starting from the second treatment day and lasting to the end of the treatment.

That the compounds of the invention are precursors of (+)- and (−)-noradrenalin in the nervous system is shown by the following experimental results:

A day before sacrifice, rats were injected with (+)-erythro-3-(3,4-dihyroxyphenyl)-serine, noradrenalin was determined spectrofluorometrically on the perchloric acid (0.1 M) treated brain and heat homogenates after passage through cation exchange and after oxidation with potassium ferricyanide. Each value represents an average of 6 to 14 determinations.

The results were as follows:

|  | Dosage (mg/kg i.p.) | Noradrenalin ($\mu$g/g) |
|---|---|---|
| Brain | control | 0.48 ± 0.01 |
|  | 50 | 1.04 ± 0.03 |
|  | 125 | 2.16 ×0.07 |
|  | 250 | 4.41 ± 0.37 |
| Heart | control | 1.03 ± 0.02 |
|  | 50 | 1.90 ± 0.02 |
|  | 125 | 3.78 ± 0.02 |
|  | 250 | 6.92 ± 0.22 |

EXAMPLE 1

215 g of rac-threo/erythro-3-(3,4-dibenzyloxyphenyl)-N-carbobenzoxyserine are dissolved with warming in 2,500 ml of acetonitrile and treated with 78 g of freshly distilled dicyclohexylamine. After allowing to stand overnight at room temperature, the crystals obtained are filtered off and washed with ether. There is obtained rac-threo-3-(3,4-dibenzyloxyphenyl)-N-carbobenzoxyserine)-dicyclohexylamine salt of melting point 144°–145°C. The remaining mother liquor (mother liquor A) can be further processed in accordance with Example 2.

Anal. Calcd. for $C_{43}H_{52}O_7N_2$: C, 72.86; H, 7.39; N, 3.95 Found: C, 72.99; H, 7.55; N, 3.78

According to the NMR spectrum, the substance is uniform and contains no contamination by the rac-erythro form.

The rac-threo-3-(3,4-dibenzyloxyphenyl)-N-carbobenzoxyserine dicyclohexylamine salt obtained is converted into rac-threo-3-(3,4-dibenzyloxyphenyl)-N-carbobenzoxyserine by reaction with hydrogen chloride gas in ethyl acetate in the manner given in Example 2. This compound is subjected to hydrogenolysis in the manner given in Example 8. There is obtained rac-threo-3-(3,4-dihydroxyphenyl)-serine.

The rac-threo/erythro-3-(3,4-dibenzyloxyphenyl)-N-carbobenzoxyserine used as the starting material can be manufactured as follows:

A well-stirred suspension of 204 g of 3,4-dibenzyloxybenzaldehyde in 830 ml of abs. ethanol is treated at room temperature in one batch with a solution of 32.1 g of sodium hydroxide and 24 g of glycine in 105 ml of water. The mixture is heated within 30 mins. to 72°C (internal temperature), a clear solution resulting. The heating is immediately stopped and the mixture left to cool to 40°C with further stirring, a semi-solid oily mass precipitating out. The whole is treated dropwise within 20 minutes with 750 ml of 2 N aqueous hydrochloric acid, caution being taken that the temperature does not exceed 45°C. After stirring for a further 3 hours, room temperature being attained, the obtained precipitate is filtered off from the reaction mixture and washed with a mixture of 50 ml of 3 N aqueous hydrochloric acid and 50 ml of ethanol. The filtrate is stirred at room temperature and treated portionwise within about 10–15 minutes with 115 g of sodium acetate trihydrate. The mixture is left to stand at 0°C for 3 hours. The crystals obtained are filtered off and washed with 200 ml of water. The crystals are pressed out and introduced with stirring into a mixture of 600 ml of ehtanol, 400 ml of water and 25 ml of conc. hydrochloric acid. After stirring for 2–3 hours at room temperature, virtually all has dissolved. 15 g of carbon are added and the mixture filtered. To the no longer clear, greenishyellow filtrate are slowly added dropwise with stirring about 30 ml of diethylamine. During the dropwise addition, the amino acid has already begun to precipitate. The mixture is left to stand overnight at about 0°C, the crystals filtered off and washed out with 100 ml of aqueous ethanol (1:1). The crystals are dried at 60°C under reduced pressure. There is obtained rac-threo/erythro-3-(3,4-dibenzyloxyphenyl)-serine of melting point 152°–155°C. The substance is difficult to dissolve in water and in most organic solvents, except dimethylformamide, at room temperature. It is also difficult to dissolve in aqueous hydrochloric acid, but slightly soluble in ethanolic hydrochloric aicd.

78.6 g of rac-threo/erythro-3 -(3,4-dibenzyloxyphenyl)-serine are dissolved together with 8 g of sodium hydroxide in 2,000 ml of water and treated with stirring with 38 g of carbobenzoxy chloride. Simultaneously, 3N aqueous sodium hydroxide is added dropwise to the mass so that the pH value comes to 8.5–9. During the dropwise addition, the separation of the sodium salt of the rac-threo/erythro-3-(3,4-dibenzyloxyphenyl)-N-carbobenzoxyserine begins. After about 3–4 hours, the pH value no longer decreases. The reaction mixture is then further stirred for 1 hour and subsequently transferred to a precipitation vessel. After the addition of about 1 kg of ice and 150 ml of 3 N aqueous hydrochloric acid, the whole is extracted twice with 1,500 ml of ethyl acetate each time. The ethyl acetate phase is washed four times with 500 ml of 0.5 N aqueous hydrochloric acid each time. The ethyl acetate solution is dried over sodium sulphate and concentrated under reduced pressure to about 500 ml. The residue is slowly diluted with 420 ml of low-boiling petroleum ether, whereupon with scratching and cooling, the crystallization begins. After leaving to stand overnight at 0°C, the crystals are filtered off and washed with 100 ml of ethyl acetate/petroleum ether (1:1) and subsequently with 100 ml of petroleum ether. In this manner, there is obtained rac-threo/erythro-3-(3,4-dibenzyloxyphenyl)-N-carbobenzoxyserine of melting point 115°–120°C.

Anal. Calcd. for $C_{31}H_{29}O_7N$: C, 70.58; H, 5.54; N, 2.65 Found: C, 70.52; H, 5.39; N, 2.70

EXAMPLE 2

The mother liquor A remaining according to Example 1 is evaporated to dryness under reduced pressure, the residue stirred with 2,000 ml of ether and left to stand overnight. After filtration, there is obtained a mixture of rac-threo- and rac-erythro-3-(3,4-dibenzyloxyphenyl)-N-carbobenzoxyserine dicyclohexylamine salt in a ratio of about 1:1 (according to NMR spectrum). The remaining mother liquor (mother liquor B) can be further processed as given in the following. The separated salt is dissolved in 2,000 ml of ethyl acetate and treated with an approximately 5N solution of hydrogen chloride gas in ethyl acetate up to a strongly acidic reaction. After stirring for 2 hours, the precipitated dicyclohexylamine hydrochloride is filtered off and rinsed with ethyl acetate. The ethyl acetate solution is washed twice with water. The ethyl acetate phase is dried over sodium sulphate and evaporated under reduced pressure. The residue is dissolved in 600 ml of boiling chloroform and left to stand overnight at room temperature. The crystals obtained are filtered off and washed with chloroform. There is obtained rac-erythro-3-(3,4-dibenzyloxyphenyl)-N-carbobenzoxyserine of melting point 143°–146°C. According to the NMR spectrum, the compound is free from impurities of the corresponding rac-threo form. The remaining mother liquor (mother liquor C) can be further processed as given in the following.

Anal. Calcd. for $C_{31}H_{29}O_7N$: C, 70.58; H, 5.54; N, 2.65 Found: C, 70.40; H, 5.50; N, 2.52

The rac-erythro-3-(3,4-dibenzyloxyphenyl)-N-carbobenzoxyserine obtained is dissolved in acetonitrile and treated with the calculated amount of dicyclohexylamine. The whole is evaporated under reduced pressure, taken up in ether and left to stand. There is obtained rac-erythro-3-(3,4-dibenzyloxyphenyl)-N-carbobenzoxyserine dicyclohexylamine salt of melting point 132°–133°C.

Anal. Calcd. for $C_{43}H_{52}O_7N_2$: C, 72.86; H, 7.39; N, 3.95 Found: C, 72.75; H, 7.38; N, 3.84

The mother liquor B can be evaporated under reduced pressure and treated with 5 N hydrogen chloride/ethyl acetate in the manner given above. The work-up is effected in the manner given above and yields a further fraction of rac-erythro-3-(3,4-dibenzyloxyphenyl)-N-carbobenzoxyserine.

The mother liquor C can be evaporated under reduced pressure, the residue dissolved in acetonitrile and treated with dicyclohexylamine. A further fraction of rac-threo-3-(3,4-dibenzyloxyphenyl)-N-carbobenzoxyserine dicyclohexylamine salt is obtained. The mother liquor D remains.

The mother liquor D can be subjected to a repeated decomposition with hydrogen chloride/ethyl acetate and crystallization from chloroform. There is thus obtained a further fraction of rac-erythro-3-(3,4-dibenzyloxyphenyl)-N-carbobenzoxyserine.

The rac-erythro-3-(3,4-dibenzyloxyphenyl)-N-carbobenzoxyserine obtained is subjected to hydrogenolysis in the manner given in Example 10. There is obtained rac-erythro-3-(3,4-dihydroxyphenyl)-serine.

EXAMPLE 3

101 g of rac-threo-3-(3,4-dibenzyloxyphenyl)-N-carbobenzoxyserine are dissolved in 2000 ml of abs. ethanol and treated with 15.6 g of (+)-epnedrine. After allowing to stand overnight at room temperature, the crystals obtained are filtered off and washed with ethanol and ether. There is obtained the (+)-ephidrine salt of (−)-threo-3-(3,4-dibenzyloxyphenyl)-N-carbobenzoxyserine which melts at 189°–190°C after recrystallization from 1,000 ml of methanol. $[\alpha]_D = +38.5°$ (c = 1; dimethylformamide).

Anal. Calcd. for $C_{41}H_{44}O_8N_2$: C, 71.08; H, 6.40; N, 4.04 Found: C, 70.98; H, 6.32; N, 3.95

EXAMPLE 4

The mother liquor and ethanol washings remaining in Example 3 are evaporated under reduced pressure, the residue dissolved in ethyl acetate and shaken with 3 N aqueous hydrochloric acid. After drying over sodium sulphate, the organic phase is evaporated under reduced pressure. The residue consists of the not yet completely optically pure (+)-threo-3-(3,4-dibenzyloxyphenyl)-N-carbobenzoxyserine which is purified further as follows:

The compound is dissolved in 2,000 ml of abs. ethanol and treated with as much (−)-ephedrine to make the mixture react weakly alkaline. The mixture is left to stand 3–4 hours, filtered off and washed with ethanol and ether. The crude product obtained is recrystallized from 1,000 ml of methanol and yields optically pure (−)-ephedrine salt of (+)-threo-3-(3,4-dibenzyloxyphenyl)-N-carbobenzoxyserine which melts at 189°–190°C. $[\alpha]_D = -38°$ (c = 1; dimethylformamide).

Anal. Calcd. for $C_{41}H_{44}O_8N_2$: C, 71.08; H, 6.40; N, 4.04 Found: C, 71.02; H, 6.40; N, 3.94

EXAMPLE 5

The mother liquor and the ethanol washings remaining in Example 3 are evaporated under reduced pressure, the residue dissolved in ethyl acetate and shaken with 3 N aqueous hydrochloric acid. After drying over sodium sulphate, the organic phase is evaporated under reduced pressure. The residue is dissolved in 200 ml of abs. ethanol and treated with a boiling hot solution of 23 g of (−)-threo-1-(p-nitrophenyl)-2-amino-1,3-propanediol in 1,800 ml of ethanol. The mixture is left to crystallize at room temperature for about 3 hours. After filtering off the obtained crystals and washing with ethanol and ether, there is obtained the (−)-threo-1-(p-nitrophenyl)-2-amino-1,3-propanediol salt of (+)-threo-3-(3,4-dibenzyloxyphenyl)-N-carbobenzoxyserine which melts at 183°–185°C. $[\alpha]_D = -29.4°C$ (c = 1; dimethylformamide).

Anal. Calcd. for $C_{40}H_{41}O_{11}N_3$: C, 64,94; H, 5.59; N, 5.68 Found: C, 65.03; H, 5.61; N, 5.56

EXAMPLE 6

37 g of rac-erythro-3-(3,4-dibenzyloxyphenyl)-N-carbobenzoxyserine are dissolved in 20 ml of abs. ethanol and treated with a solution of 7.5 g of (−)-threo-1-(p-nitrophenyl)-2-amino-1,3-propanediol in 180 ml of boiling hot ethanol. The mixture is left at room temperature for 2-3 hours to crystallize, filtered off and washed with ethanol and ether. The product obtained is crystallized from 200 ml of methanol. There is obtained the (−)-threo-1-(p-nitrophenyl)-2-amino-1,3-propanediol salt of (−)-erythro-3-(3,4-dibenzyloxyphenyl)-N-carbobenzoxyserine of melting point 159°–160°C; $[\alpha]_D = -24.3°$ ($c = 1$; acetone); $+9.8°$ ($c = 1$; acetonitrile).

Anal. Calcd. for $C_{40}H_{41}O_{11}N_3$: C, 64.94; H, 5.59; N, 5.68 Found: C, 64.76; H, 5.44; N, 5.56

EXAMPLE 7

The mother liquor remaining according to Example 6 is concentrated to about 20 ml under reduced pressure and treated with a boiling hot solution of 7.5 g of (+)-threo-1-(p-nitrophenyl)-2-amino-1,3-propanediol in 180 ml of ethanol. The mixture is left at room temperature for 2-3 hours to crystallize, filtered off and washed with ethanol and ether. After recrystallization from 300 ml of methanol, there is obtained the (+)-threo-1-(p-nitrophenyl)-2-amino-1,3-propanediol salt of (+)-erythro-3-(3,4-dibenzyloxyphenyl)-N-carbobenzoxyserine of melting point 163°–165°C; $[\alpha]_D = +24.3°$ (c = 1; acetone); $-9.4°$ (c = 1; acetonitrile).

Anal. Calcd. for $C_{40}H_{41}O_{11}N_3$: C, 64.94; H, 5.59; N, 5.68 Found: C, 64.62; H, 5.53; N, 5.57

EXAMPLE 8

50 g of (+)-ephedrine salt of (−)-threo-3-(3,4-dibenzyloxyphenyl)-N-carbobenzoxyserine are shaken with a mixture of 500 ml of ethyl acetate and 300 ml of 3 N aqueous hydrochloric acid in a separating funnel until formation of two clear layers. The ethyl acetate phase is separated, washed once with water and the aqueous phase again extracted with ethyl acetate. The combined ethyl acetate phases are dried over sodium sulphate, evaporated under reduced pressure and crystallized from a mixture of ethyl acetate, isopropyl ether and petroleum ether. There is obtained (−)-threo-3-(3,4-dibenzyloxyphenyl)-N-carbobenzoxyserine of melting point 134°–135°C; $[\alpha]_D = -17.2°$ ($c = 1$; chloroform).

Anal. Calcd. for $C_{31}H_{29}O_7N$: C, 70.58; H, 5.54; N, 2.65 Found: C, 70.44; H, 5.50; N, 2.55

10.4 g of (−)-threo-3-(3,4-dibenzyloxyphenyl)-N-carbobenzoxyserine are dissolved in 400 ml of ethanol and 21 ml of 1 N aqueous hydrochloric acid and hydrogenated with palladium-carbon (5%). After termination of the hydrogen uptake, the catalyst is filtered off and the filtrate completely evaporated down, the last traces of moisture being removed by repeated evporation with ethanol. The residue is dissolved in 100 ml of abs. ethanol and, with cooling, adjusted to a pH value of 5.5–6 with a dilute ethanolic diethylamine solution. A precipitate forms. The whole is left to stand overnight at −15°C, filtered and washed with ethanol and ether. For further purification, the crystals are introduced into 200 ml of boiling water and subsequently filtered. The crystallization is completed by standing overnight at about 0°C. The crystals are filtered off, washed with ethanol and ether and dried under reduced pressure at about 80°–90°C. There is obtained (−)-threo-3-(3,4-dihydroxyphenyl)-serine which melts at 232°–235°C under decomposition; $[\alpha]_D = -39°$ ($c = 1$; 1 N aqueous hydrochloric acid).

Anal. Calcd for $C_9H_{11}O_5N$: C, 50.71; H, 5.20; N, 6.57 Found: C, 50.61; H, 5.26; N, 6.45

EXAMPLE 9

In the same manner as given in Example 8, from the (−)-ephedrine salt or (−)-threo-1-(p-nitrophenyl)-2-amino-1,3-propanediol salt of (+)-threo-3-(3,4-dibenzyloxyphenyl)-N-carbobenzoxyserine there is obtained the free acid (+)-threo-3-(3,4-dibenzyloxyphenyl)-N-carbobenzoxyserine which melts at 134°–135°C; $[\alpha]_D = +16.9°$ ($c = 1$; chloroform).

Anal. Calcd. for $C_{31}H_{29}O_7N$: C, 70.58; H, 5.54; N, 2.65 Found: C, 70.67; H, 5.53; N, 2.61

The (+)-threo-3-(3,4-dibenzyloxyphenyl)-N-carbobenzoxyserine obtained is subjected to hydrogenolysis in analogy to Example 8. There is obtained (+)-threo-3-(3,4-dihydroxyphenyl)-serine of melting point 232°–235°C (decomposition); $[\alpha]_D = +39°$ (c = 1; 1 N aqueous hydrochloric acid).

Anal. Calcd. for $C_9H_{11}O_5N$: C, 50.71; H, 5.20; N, 6.57 Found: C, 51.07; H, 5.19; N, 6.34

EXAMPLE 10

The (−)-threo-1-(p-nitrophenyl)-2-amino-1,3-propanediol salt of (−)-erythro-3-(3,4-dibenzyloxyphenyl)-N-carbobenzoxyserine is converted into the free acid (−)-erythro-3-(3,4-dibenzyloxyphenyl)-N-carbobenzoxyserine in analogy to Example 8, with the difference that the crude product is crystallized from methanol. The (−)-erythro-3-(3,4-dibenzyloxyphenyl)-N-carbobenzoxyserine obtained melts at 154°–157°C; $[\alpha]_D = -42.0°$ (c = 1; chloroform).

Anal. Calcd. for $C_{31}H_{29}O_7N$: C, 70.58; H, 5.54; N, 2.65 Found: C, 70.22; H, 5.31; N, 2.57

13 g of (−)-erythro-3-(3,4-dibenzyloxyphenyl)-N-carbobenzoxyserine are suspended in a mixture of 370 ml of ethanol and 120 ml of water and hydrogenated with palladium-carbon (5). After the hydrogen uptake has taken place, the catalyst is filtered off and the filtrate evaporated under reduced pressure until removal of the water (bath temperature not above 40°C). The whole is left to stand overnight at −15°C and subsequently filtered. The crystals are washed with ethanol and ether and for further purification dissolved in 15 ml of pre-boiled water, filtered and left to crystallize overnight at about 0°C. The crystals are filtered off, washed with ethanol and ether and dried in air. There is obtained (−)-erythro-3-(3,4-dihydroxyphenyl)-serine of melting point 191°–194°C (decomposition); $[\alpha]_D = -51.9°$ (c = 1; 1 N aqueous hydrochloric acid). The preparation tastes very sweet.

Anal. Calcd. for $C_9H_{11}O_5N·3H_2O$: C, 40.45; H, 6.41; N, 5.24; $H_2O$, 20.23 Found: C, 40.36; H, 6.17; N, 5.17; $H_2O$, 19.62

EXAMPLE 11

In analogy to Example 8, from the (+)-threo-1-(p-nitrophenyl)-2-amino-1,3-propanediol salt of (+)-erythro-3-(3,4-dibenzyloxyphenyl)-N-carbobenzoxyserine there is obtained the free acid (+)-erythro-3-(3,4-dibenzyloxyphenyl)-N-carbobenzoxyserine of melting point 154°–157°C; $[\alpha]_D = +42.5°$ (c = 1; chloroform).

Anal. Calcd. For $C_{31}H_{29}O_7N$: C, 70.58; H, 5.54; N, 2.65 Found: C, 70.80; H, 5.40; N, 2.57

The (+)-erythro-3-(3,4-dibenzyloxyphenyl)-N-carbobenzoxyserine obtained as subjected to hydrogenolysis in analogy to Example 10.

There is obtained (+)-erythro-3-(3,4-dihydroxyphenyl)-serine of melting point 191°–194°C (decomposition); $[\alpha]_D = +51.9°$ (c = 1; 1 N aqueous hydrochloric acid). The compound is tasteless.

Anal. Calcd. for $C_9H_{11}O_5N \cdot 3H_2O$: C, 40.45; H, 6.41; N, 5.24; $H_2O$, 20.23 Found: C, 40.47; H, 6.17; N, 5.20; $H_2O$, 19.76

EXAMPLE 12

Manufacture of tablets of the following composition:

| | |
|---|---|
| (−)-Threo-3-(3,4-dihydroxyphenyl)-serine | 100 mg |
| Lactose | 61 mg |
| Maize starch | 30 mg |
| Polyvinylpyrrolidone | 4 mg |
| Talcum | 5 mg |

The active material is mixed with the lactose and maize starch and, after addition of a solution of polyvinylpyrrolidone in 40 ml of ethanol, the mixture is granulated. The granulate is dried at 30°C, mixed with talcum and pressed into tablets.

| | |
|---|---|
| Individual tablet weight | 200 mg |
| Active material content of one tablet | 100 mg |

The (−)-threo-3-(3,4-dihydroxyphenyl)-serine can be replaced by (+)-threo-3-(3,4-dihydroxyphenyl)-serine, (−)-erythro-3-(3,4-dihydroxyphenyl)-serine or (+)-erythro-3-(3,4-dihydroxyphenyl)-serine.

EXAMPLE 13

Manufacture of gelatine capsules of the following composition:

| | | |
|---|---|---|
| (−)-Threo-3-(3,4-dihydroxyphenyl)-serine | 50 | mg |
| Mannitol | 98.5 | mg |
| Stearic acid | 1.5 | mg |

The ingredients are homogeneously mixed and filled into gelatine interlocking capsules No. 2 via a capsule filling machine.

| | |
|---|---|
| Individual capsule weight | 150 mg |
| Active material content of one capsule | 50 mg |

The (−)-threo-3-(3,4-dihydroxyphenyl)-serine can be replaced by (+)-threo-3-(3,4-dihydroxyphenyl)-serine, (−)-erythro-3-(3,4-dihydroxyphenyl)-serine or (+)-erythro-3-(3,4-dihydroxyphenyl)-serine.

EXAMPLE 14

200 Parts of $N^1$-(DL-seryl)-$N^2$-(2,3,4-trihydroxybenzyl)-hydrazine-hydrochloride, 200 parts (+)-erythro-3-(3,4-dihydroxyphenyl)-serine, 5 parts citric acid, 30 parts microcrystalline cellulose and 60 parts cornstarch were granulated and dried in the usual manner. The mixture was mechanically pulverized, then together with 5 parts magnesium stearate the mixture was homogenized and then pressed into tablets weighing 500 mg each. Each tablet had the following composition:

| | |
|---|---|
| $N^1$-(DL-seryl)-$N^2$-(2,3,4-trihydroxybenzyl)-hydrazine hydrochloride | 200 mg |
| (+)-erythro-3-(3,4-dihydroxyphenyl)-serine | 200 mg |
| citric acid | 5 mg |
| microcrystalline cellulose | 30 mg |
| cornstarch | 60 mg |
| magnesium stearate | 5 mg |
| Total weight | 500 mg |

We claim:

1. An optical antipode selected from the group consisting of (−)-threo-, (+)-threo-, (−)-erythro and (+)-erythro-3-(3,4-dihydroxyphenyl)-serine and the pharmaceutically acceptable salts thereof essentially free of the optical antipodes of the reverse sign.

2. The optical antipode of claim 1 which is (−)-threo-3-(3,4-dihydroxyphenyl)-serine.

3. The optical antipode of claim 1 which is (+)-threo-3-(3,4-dihydroxyphenyl)-serine.

4. The optical antipode of claim 1 which is (−)-erythro-3-(3,4-dihydroxyphenyl)-serine.

5. The optical antipode of claim 1 which is (+)-erythro-3-(3,4-dihydroxyphenyl)-serine.

6. A process for preparing the rac-threo and rac-erythro forms of 3-(3,4-dihydroxyphenyl)-serine and the pharmaceutically acceptable salts thereof, which process comprises
   a. treating an acetonitrile solution of rac-threo/erythro-3-(3,4-dibenzyloxyphenyl)-N-carbobenzoxy-serine with dicyclohexylamine and isolating the precipitated rac-threo-3-(3,4-benzyloxyphenyl)-N-carbobenzoxy-serine dicyclohexylamine salt;
   b. acidifying the mother liquor from step (a), replacing the solvent with chloroform and isolating the precipitated rac-erythro-3-(3,4-dibenzyloxyphenyl)-N-carbobenzoxyserine; and
   c. producing the desired rac-threo or rac-erythro-3-(3,4-dihydroxyphenyl)-serine by separate catalytic hydrogenolysis of the products of steps (a) and (b), provided however, that the product of step (a) is first converted to the free acid by acidification with aqueous mineral acid.

7. The process of claim 6 wherein the mother liquor from step (b) is concentrated and the solvent replaced by acetonitrile, the resulting solution treated with dicyclohexylamine and the precipitated rac-threo-3-(3,4-dibenzyloxyphenyl)-N-carbobenzoxyserine dicyclohexylamine salt is recycled into the process.

8. A process for resolving rac-threo-3-(3,4-dibenzyloxyphenyl)-N-carbobenzoxyserine into its optical antipodes, which process comprises treating said racemic compound with a resolving agent selected from the group consisting of optically active ephedrine and optically active threo-1-(p-nitrophenyl)-2-amino-1,3-propanediol in ethanolic solution, the resulting insoluble diastereomer is collected, the soluble optical antipode in the mother liquor is treated with said resolving agent of opposite sign than used before to precipitate the resulting second insoluble diastereomer and said first and second diastereomers are independently treated with aqueous mineral acid to produce the desired optical antipodes of threo-3-(3,4-dibenzyloxyphenyl)-N-carbobenzoxyserine.

9. The resolution process of claim 8 wherein said racemic compound is treated with (+)-ephedrine to thereby precipitate the (+)-ephedrine salt of (−)-threo-3-(3,4-dibenzyloxyphenyl)-N-carbobenzoxy-serine, and the mother liquor is treated with (−)-ephedrine or (−)-threo-1-(p-nitrophenyl)-2-amino-1,3-propanediol to thereby precipitate the corresponding salt of (+)-threo-3-(3,4-dibenzyloxyphenyl)-N-carbobenzoxy-serine 10. A process for the resolution of rac-erythro-3-(3,4-dibenzyloxyphenyl)-N-carbobenzoxyserine which process comprises treating said racemic compound with optically active threo-1-(p-nitrophenyl)-2-amino-1,3-propanediol in ethanolic solution, isolating the diastereomer which crystallizes out, treating the mother liquor with the opposite antipode of said optically active threo-1-(p-nitrophenyl)-2-amino-1,3-propanediol, isolating the second diastereomer, which crystallizes out, and then independently treating both said diastereomers with mineral acid to produce said optical antipodes of erythro-3-(3,4-dibenzyloxyphenyl)-N-carbobenzoxyserine.

11. The resolution process of claim 10 wherein the diastereomers produced are the (−)-(−) or the (+)-(+) salts.

12. Rac-threo-3-(3,4-dibenzyloxyphenyl)-N-carbobenzoxyserine and pharmaceutically acceptable salts thereof.

13. Rac-erythro-3-(3,4-dibenzyloxyphenyl)-N-carbobenzoxyserine and pharmaceutically acceptable salts thereof.

14. (−)-Threo-3-(3,4-dibenzyloxyphenyl)-N-carbobenzoxyserine and pharmaceutically acceptable salts thereof.

15. (+)-Threo-3-(3,4-dibenzyloxyphenyl)-N-carbobenzoxyserine and pharmaceutically acceptable salts thereof.

16. (−)-Erythro-3-(3,4-dibenzyloxyphenyl)-N-carbobenzoxyserine and pharmaceutically acceptable salts thereof.

17. (+)-Erythro-3-(3,4-dibenzyloxyphenyl)-N-carbobenzoxyserine and pharmaceutically acceptable salts thereof.

18. The (+)-ephedrine salt of (−)-threo-3-(3,4-dibenzyloxyphenyl)-N-carbobenzoxy-serine.

19. The (−)-ephedrine or (−)-threo-1-(p-nitrophenyl)-2-amino-1,3-propanediol salt of (+)-threo-3-(3,4-dibenzyloxyphenyl)-N-carbobenzoxy-serine.

20. The (−)-threo-1-(p-nitrophenyl)-2-amino-1,3-propanediol salt of (−)-erythro-3-(3,4-dibenzyloxyphenyl)-N-carbobenzoxy-serine.

21. The (+)-threo-1-(p-nitrophenyl)-2-amino-1,3-propanediol salt of (+)-erythro-3-(3,4-dibenzyloxyphenyl)-N-carbobenzoxy-serine.

* * * * *

UNITED STATES PATENT AND TRADEMARK OFFICE
CERTIFICATE OF CORRECTION

PATENT NO. : 3,920,728

DATED : November 18, 1975

INVENTOR(S) : Balthasar Hegedus and Anna Krasso

It is certified that error appears in the above–identified patent and that said Letters Patent are hereby corrected as shown below:

Cover page, after [30] Foreign Application Priority Data
August 22, 1973    Switzerland    12056/73

Insert:    July 9, 1974    Switzerland    9420/74

*Signed and Sealed this*

Twentieth Day of July 1976

[SEAL]

Attest:

RUTH C. MASON
*Attesting Officer*

C. MARSHALL DANN
*Commissioner of Patents and Trademarks*